US012017750B2

(12) United States Patent
Walter

(10) Patent No.: US 12,017,750 B2
(45) Date of Patent: Jun. 25, 2024

(54) PYROTECHNIC DEVICES AND FIRING MECHANISMS FOR AIRCRAFT CANOPY JETTISON

(71) Applicant: The Boeing Company, Chicago, IL (US)

(72) Inventor: Matthew W. Walter, Troy, MO (US)

(73) Assignee: The Boeing Company, Arlington, VA (US)

( * ) Notice: Subject to any disclaimer, the term of this patent is extended or adjusted under 35 U.S.C. 154(b) by 94 days.

(21) Appl. No.: 17/860,785

(22) Filed: Jul. 8, 2022

(65) Prior Publication Data

US 2024/0010321 A1    Jan. 11, 2024

(51) Int. Cl.
*B64C 1/32* (2006.01)
*B64C 1/14* (2006.01)
*F42B 3/00* (2006.01)

(52) U.S. Cl.
CPC .............. *B64C 1/32* (2013.01); *B64C 1/1476* (2013.01); *F42B 3/006* (2013.01)

(58) Field of Classification Search
CPC .......... B64C 1/32; B64C 1/1476; F42B 3/006
USPC ........................................................ 102/335
See application file for complete search history.

(56) References Cited

U.S. PATENT DOCUMENTS

| | | | | |
|---|---|---|---|---|
| 5,072,896 | A * | 12/1991 | McIntyre | B64C 1/1476 102/272 |
| 5,228,642 | A * | 7/1993 | Bright | B64C 1/1476 244/121 |
| 5,289,996 | A * | 3/1994 | Speelman, III | B64C 1/32 D12/345 |
| 8,092,623 | B1 | 1/2012 | Cramer et al. | |
| 11,220,322 | B2* | 1/2022 | Walter | B64C 1/1476 |
| 11,220,324 | B2 | 1/2022 | Bar Hillel et al. | |
| 2022/0250733 | A1* | 8/2022 | Walter | B64D 25/00 |
| 2024/0010321 | A1* | 1/2024 | Walter | B64C 1/1476 |

FOREIGN PATENT DOCUMENTS

EP    0906898 A2 *  4/1999

OTHER PUBLICATIONS

Department of the Army, "Engineering Design Handbook Propellant Actuated Devices," AMC Pamphlet No. 706-270, Sep. 30, 1975, Alexandria, VA, US, 195 pages. (Uploaded in Multiple Parts).

(Continued)

*Primary Examiner* — Samir Abdosh
(74) *Attorney, Agent, or Firm* — Hanley, Flight & Zimmerman, LLC

(57) ABSTRACT

Pyrotechnic devices and firing mechanisms for aircraft canopy jettison are disclosed herein. An example firing mechanism includes a housing defining a first bore, a second bore, and a channel between the first bore and the second bore, a primary charge disposed in the second bore, a closure disc between the second bore and the channel, and a firing pin assembly disposed in the first bore. The firing pin assembly includes a percussion primer and a firing pin piston including a piston body, a firing pin extending from the piston body, and a piercing pin extending from the piston body. In response to a firing signal, the firing pin piston is moved toward the primary charge such that the piercing pin punctures the closure disc and the firing pin engages the percussion primer to ignite the primary charge.

19 Claims, 5 Drawing Sheets

(56) References Cited

OTHER PUBLICATIONS

Military Specification, "Cartridge Actuated Devices/Propellant Actuated Devices General Design Specification For," MIL-C-83124, Oct. 30, 1969, 21 pages.

Military Specification, "Cartridges for Cartidge Actuated/Propellant Actuated Devices, General Design Specification For," MIL-C-83125, Mar. 10, 1969, 14 pages.

* cited by examiner

PYROTECHNIC DEVICES AND FIRING MECHANISMS FOR AIRCRAFT CANOPY JETTISON

GOVERNMENT LICENSE RIGHTS

This invention was made with Government support under 18-D-0107 awarded by the United States Department of Defense. The government has certain rights in this invention.

FIELD OF THE DISCLOSURE

This disclosure relates generally to aircraft and, more particularly, to pyrotechnic devices and firing mechanisms for aircraft canopy jettison.

BACKGROUND

Some known aircraft include an ejection system for ejecting a seat (along with a pilot) from a cockpit of the aircraft. Prior to ejecting the seat (along with the pilot), a canopy over the cockpit is jettisoned from the aircraft so that the seat (and/or the pilot) do not collide with the canopy during ejection. The aircraft includes a thrusting/unlatching system that quickly unlatches the canopy prior to initiating the launching of the canopy from the fuselage. This thrusting/unlatching system includes one or more pyrotechnic devices that provide fast, powerful actuations.

SUMMARY

An example firing mechanism for a pyrotechnic device disclosed herein includes a housing defining a first bore, a second bore, and a channel between the first bore and the second bore, a primary charge disposed in the second bore, a closure disc between the second bore and the channel, and a firing pin assembly disposed in the first bore. The firing pin assembly includes a percussion primer and a firing pin piston including a piston body, a firing pin extending from the piston body, and a piercing pin extending from the piston body. In response to a firing signal, the firing pin piston is moved toward the primary charge such that the piercing pin punctures the closure disc and the firing pin engages the percussion primer to ignite the primary charge.

An example pyrotechnic device disclosed herein includes a body defining a chamber, a piston disposed in the chamber, and a firing mechanism coupled to the body. The firing mechanism is to, when triggered, generate high pressure in the chamber to move the piston. The firing mechanism includes a housing defining a first bore, a second bore, and a channel between the first bore and the second bore, a firing pin assembly disposed in the first bore, a primary charge disposed in the second bore, and first and second closure discs welded to the housing to hermetically seal the primary charge in the second bore.

An example aircraft disclosed herein includes a forward fuselage defining a cockpit, a canopy removably coupled to the forward fuselage over the cockpit, and a pyrotechnic device to unlatch the canopy from the forward fuselage. The pyrotechnic device includes a firing mechanism. The firing mechanism includes a housing defining a first bore, a second bore, and a channel between the first bore and the second bore, a primary charge disposed in the second bore, a closure disc between the second bore and the channel, a percussion primer, and a firing pin piston including a piston body, a firing pin extending from the piston body, and a piercing pin extending from the piston body. The firing pin is a first distance from the percussion primer and the piercing pin is a second distance from the closure disc. The second distance being less than the first distance.

BRIEF DESCRIPTION OF THE DRAWINGS

The figures are not to scale. In general, the same reference numbers will be used throughout the drawing(s) and accompanying written description to refer to the same or like parts.

Figure 1:
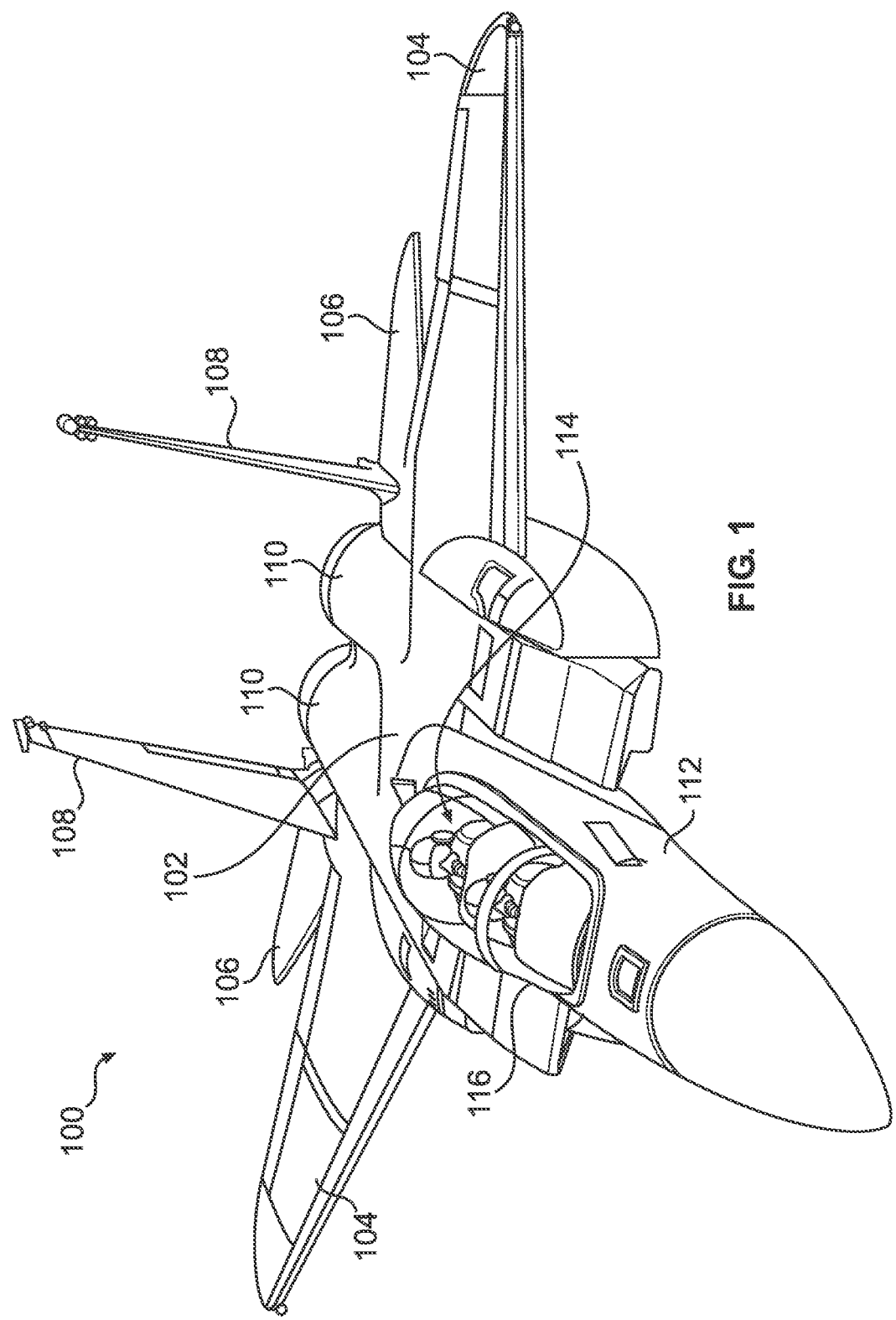
FIG. 1 illustrates an example aircraft in which the examples disclosed herein can be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example firing mechanisms and example pyrotechnic devices incorporating such example firing mechanisms. The example pyrotechnic devices and firing mechanisms disclosed can be used on an aircraft canopy jettison system, for example. The example firing mechanisms disclosed herein have longer lifespans than known firing mechanisms, which reduces costs and maintenance associated with replacing and/or servicing the firing mechanisms.

Pyrotechnic devices are used in many applications. In general, pyrotechnic devices convert a small explosive or combustive force into a working force that can be used to move one or more objects. For example, some aircraft, such as fighter planes, include an ejection system that can be triggered to eject one or more pilots from a cockpit of the aircraft. Before ejecting the pilot(s), a canopy over the cockpit is jettisoned (removed) from the cockpit according to a jettison sequence. The canopy jettison system includes one or more pyrotechnic devices (e.g., a series of pyrotechnic devices). The pyrotechnic device(s), when triggered, can be used to provide a fast, powerful burst of motion to help unlock and/or launch canopy away from the fuselage.

Example pyrotechnic devices disclosed herein include a firing mechanism. The firing mechanism includes a primary charge (e.g., propellant) and a piston or firing pin assembly that can ignite the primary charge. The primary charge, when activated (e.g., ignited), provides a high pressure burst that is used to generate motion or working power. The primary charge material tends to deteriorate when exposed to atmospheric conditions. Therefore, known firing mechanisms attempt to seal the primary charge between two discs constructed of Mica, which is brittle enough to be ruptured during the ignition process. However, these known discs still allow leak paths to the atmosphere. Therefore, known firing mechanism devices have limited lifespans (e.g., only a few years) and must be removed, discarded, and replaced periodically. This lifespan can be shortened even further because of the harsh atmospheric conditions experienced during flight.

Disclosed herein are example firing mechanisms that include welded closure discs to seal the primary charge. In particular, the closure discs, which are constructed of metal (e.g., stainless steel), are welded to the housing of the firing mechanism. This enables the primary charge to be hermetically sealed in the body of the firing mechanism, thereby preventing or substantially limiting leak paths to the primary charge. As such, the example firing mechanisms have longer lifespans than known firing mechanisms.

The example firing mechanisms disclosed herein include a firing pin piston with a piercing pin that is used to puncture one of the welded closure discs during activation. This ensures the welded closure disc is ruptured or opened. This also eliminates the need for an ignition charge, which is commonly used in known firing mechanisms between the percussion primers and the primary charge. For example, when a firing signal is received (e.g., during a canopy jettison operation), the firing pin piston is moved toward the welded closed disc such that the piercing pin engages and punctures a hole in the welded closure disc. Further, the firing pin piston includes one or more firing pins that impacts one or more percussion primers, which creates a spark or hot byproducts that ignite the primary charge. In some examples, the distance between the piercing pin and the closure disc is less than the distance between the firing pin(s) and the percussion primer(s). As such, when the firing pin piston is fired, the piercing pin punctures a hole in the welded closure disc first, and then the percussion primer(s) are activated. This ensures there is a flow path for the spark or hot byproducts from the percussion primer(s) to ignite the primary charge.

Now turning to the figures, FIG. 1 illustrates an example aircraft 100 in which the examples disclosed herein can be implemented. In the illustrated example, the aircraft 100 includes a fuselage 102, wings 104, horizontal stabilizers 106, vertical stabilizers 108, and engines 110 (e.g., jet engines). In operation, the engines 110 generate thrust to propel the aircraft 100 forward while the wings 104 generate lift. The wings 104, the horizontal stabilizers 106, and/or the vertical stabilizers 108 can include movable control surfaces (e.g., ailerons, flaps, elevators, rudders, etc.) to maneuver the aircraft 100 while thrust is provided by the engines 110. In other examples, the aircraft 100 can include more or fewer engines and/or more or fewer flight control surfaces.

In the illustrated example, the aircraft 100 includes a forward fuselage 112 (sometimes referred to as an aircraft forebody). The forward fuselage 112 defines a cockpit 114. One or more persons (e.g., a pilot, a passenger, etc.) can sit in the cockpit 114 to operate and/or otherwise travel in the aircraft 100. In this example, the cockpit 114 holds two persons. In other examples, the cockpit 114 may be designed to hold only one person or more than two persons. The person(s) sit in respective seats in the cockpit 114.

In the illustrated example, the aircraft 100 includes a canopy 116 disposed over the cockpit 114. The canopy 116 is at least partially constructed of transparent glass, plastic, or other material that enables the pilot(s) and/or passenger(s) to see out of the aircraft 100. The canopy 116 is removably coupled to the forward fuselage 112 over the cockpit 114 and can be removed from the forward fuselage 112 during an ejection operation or sequence. In particular, the aircraft 100 includes an ejection system that can be used to eject the seat(s) from the aircraft 100 during a critical situation. Prior to ejecting the seat(s), the example ejection system jettisons the canopy 116 from the forward fuselage 112. The example ejection system includes one or more pyrotechnic devices to jettison the canopy 116 away from the forward fuselage 112. In particular, the pyrotechnic device(s) provide fast, powerful actuating means to unlatch and launch the canopy 116 away from the forward fuselage 112. For example, the ejection system can include a canopy unlatch thruster and one or more rocker motors. The unlatch thruster, when activated, actuates a series of mechanisms to unlatch the canopy 116 from the forward fuselage 112. Then, the rocket motors propel or launch the canopy 116 upward. The canopy unlatch thruster and/or the rocket motor can include and/or be activated by one or more pyrotechnic devices. Therefore, the example pyrotechnic devices disclosed herein can be used to unlatch the canopy 116 from the forward fuselage 112 prior to initiating the jettisoning of the canopy 116 away from the forward fuselage 112. Example pyrotechnic devices are disclosed in further detail here.

In the illustrated example, the aircraft 100 is depicted as a type of fighter jet aircraft. However, the example pyrotechnic devices and firing mechanisms disclosed herein can be implemented in any other type of vehicle, such as other fixed wing aircraft (e.g., a commercial aircraft), non-fixed wing aircraft, and/or other types of vehicles (e.g., a car, a train, etc.). Further, the example pyrotechnic devices and firing mechanisms disclosed herein can be implemented in non-vehicular applications.

Figure 2:
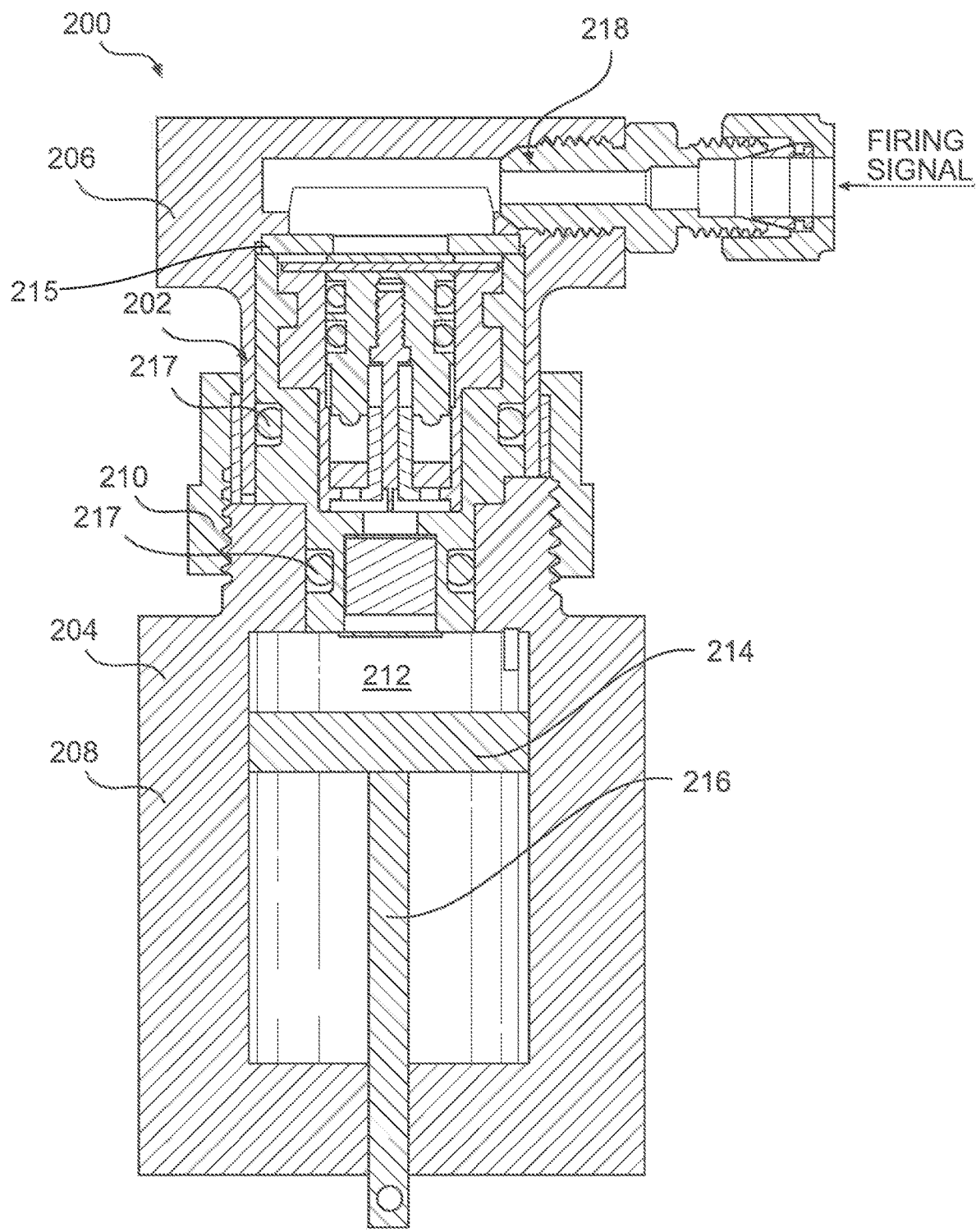
FIG. 2 is a cross-sectional view of an example pyrotechnic device including an example firing mechanism that can be implemented on the aircraft of FIG. 1.

FIG. 2 is a cross-sectional view of an example pyrotechnic device 200 including an example firing mechanism 202 constructed in accordance with teachings of this disclosure. The pyrotechnic device 200 can also be referred to as a gas generator pyrotechnic device. The pyrotechnic device 200, when activated or triggered, is used to move a working device. For example, the pyrotechnic device 200 can be part of the ejection system and used to unlock and/or launch the canopy 116 (FIG. 1).

In the illustrated example, the pyrotechnic device 200 includes a body 204. In this example, the body 204 includes a first body portion 206 coupled to a second body portion 208 via a collar 210 (e.g., a threaded collar). The first body portion 206 can be considered a manifold, and the second body portion 208 can be considered an actuator cylinder. In other examples, the body 204 can include more or fewer body portions. The second body portion 208 of the body 204 defines a chamber 212. In the illustrated example, the pyrotechnic device 200 includes a piston 214 disposed in the chamber 212, and a stem 216 coupled to the piston 214 and extending outward from the second body portion 208. The stem 216 can be coupled to another structure or system used to unlock and/or launch the canopy 116 (FIG. 1).

In the illustrated example, the firing mechanism 202 is coupled to and disposed in the body 204. In particular, in this example, the firing mechanism 202 is partially disposed in each of the first body portion 206 and the second body portion 208. In the illustrated example, a washer or spacer 215 is disposed above the firing mechanism 202 in the second body portion 206. The firing mechanism 202 is clamped between the first body portion 206 and the second body portion 208. Additionally or alternatively, in some examples the firing mechanism 202 is held in the body 204 via welding and/or threaded fastener(s). In the illustrated example, the pyrotechnic device 200 includes one or more seals 217 (e.g., o-rings) between the body 204 and the firing mechanism 202. The seals 217 prevent or limit gas or other fluid from leaking past the firing mechanism 202. The first body portion 206 defines a passageway 218 to the firing mechanism 202. To activate the pyrotechnic device 200, a firing signal is supplied to the passageway 218. The firing signal can be a pressure signal (e.g., a burst of high pressure air). The firing signal activates or triggers the firing mechanism 202. The firing mechanism 202 ignites a charge or propellant, which provides a high pressure pulse or burst into the chamber 212. This high pressure moves the piston 214 and, thus, the stem 216. As mentioned above, the stem 216 can be coupled to one or more structures or systems for unlocking and/or launching the canopy 116 (FIG. 1). Therefore, when the firing mechanism 202 is triggered and the piston 214 is moved, the canopy 116 is unlocked and/or launched.

Figure 3:
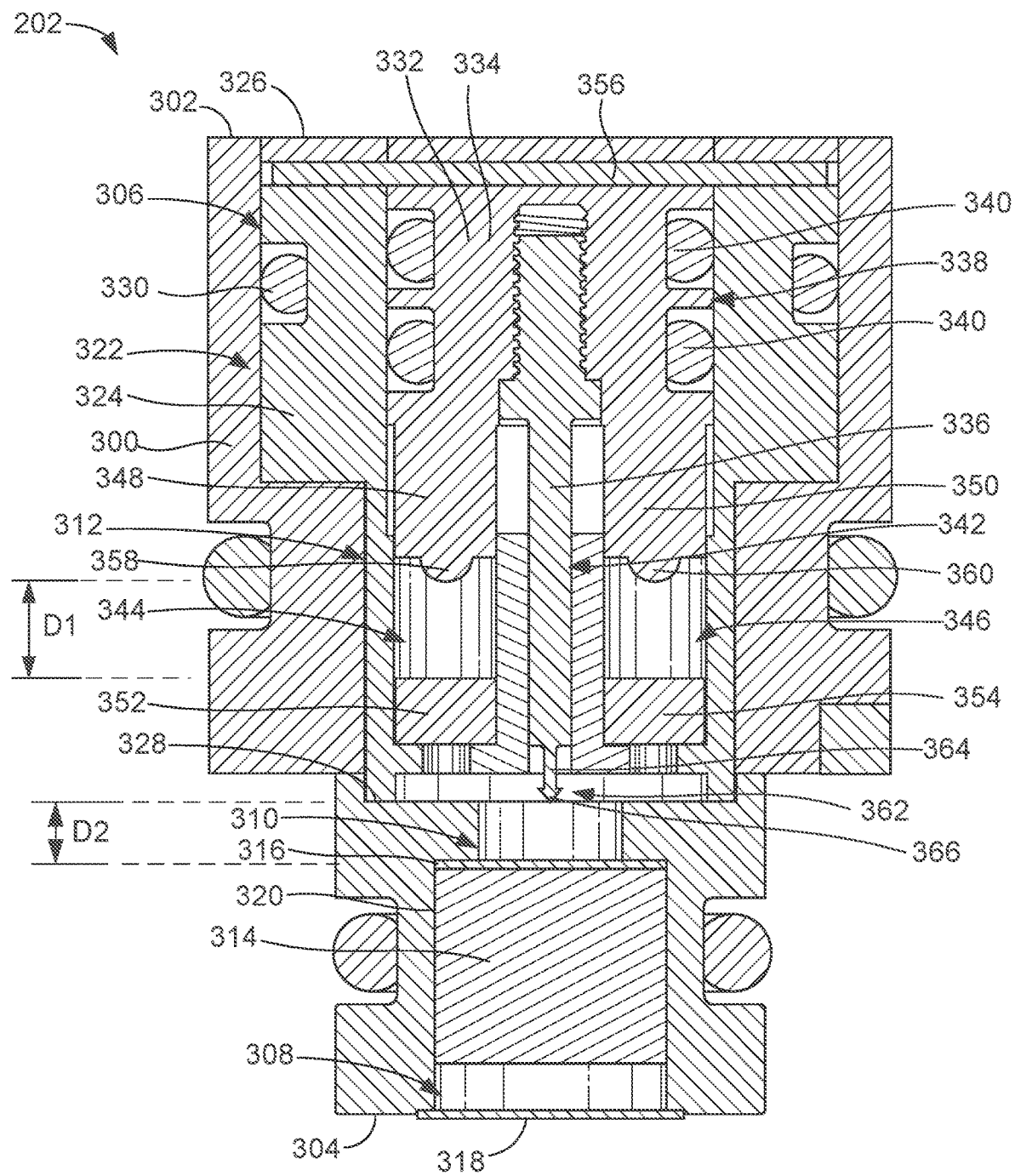
FIG. 3 is an enlarged cross-sectional view of the example firing mechanism of FIG. 2.

FIG. 3 is an enlarged cross-sectional view of the firing mechanism 202. The firing mechanism 202 includes a body or housing 300 (which may also be referred to as a booster housing) having a first end 302 and a second end 304 opposite the first end 302. The housing 300 defines a first bore 306 extending into the first end 302, a second bore 308 extending into the second end 304, and a channel 310 between the first bore 306 and the second bore 308. Therefore, the first and second bores 306, 308 and the channel 310 form a passageway or channel 312 between extending between the first and second ends 302, 304. In some examples, the housing 300 is constructed of metal, such as stainless steel. Additionally or alternatively, the housing 300 can be constructed of other materials (e.g., aluminum).

In the illustrated example, the firing mechanism 202 includes a primary charge 314 (which can also be referred to as a primary propellant charge) disposed in the second bore 308. In some examples, the primary charge 314 includes titanium hydride potassium perchlorate (THPP). In other examples, the primary charge 314 can include other materials, such as zirconium potassium perchlorate (ZPP). The primary charge 314 can be installed or inserted into the second bore 308 from the second end 304. To prevent air from leaking into the second bore 308 and potentially deteriorating the primary charge 314, the primary charge 314 is hermetically sealed in the second bore 308. In the illustrated example, the firing mechanism 202 includes a first closure disc 316 coupled to the housing 300 between the second bore 308 and the channel 310 and a second closure disc 318 coupled to the second end 304 over the second bore 308. The first and second closure discs 316, 318 are constructed of metal, such as stainless steel. In this example, the first and second closure discs 316, 318 are welded to the housing 300. For example, the first closure disc 316 can be welded to an inner surface 320 of the housing 300 between the second bore 308 and the channel 310 (e.g., at a shoulder between the second bore 308 and the channel 310) and the second closure disc 318 can be welded to the second end 304 over the second bore 308. As such, the primary charge 314 is hermetically sealed between the first and second closure discs 316, 318 in the second bore 308. This limits and/or prevents atmospheric air from leaking into the second bore 308 and potentially deteriorating the primary charge 314. As such, the primary charge 314 has a longer life span or shelf life.

In the illustrated example, the firing mechanism 202 includes a firing pin assembly 322 disposed in the first bore 306. The firing pin assembly 322 can be installed or inserted in the first bore 306 from the first end 302. The firing pin assembly 322 is used to ignite or activate the primary charge 314, as disclosed in further detail herein. The firing pin assembly 322 includes a body or housing 324 having a first end 326 and a second end 328 opposite the first end 326. In some examples, the housing 324 of the firing pin assembly 322 is held in the housing 300 via the washer 215 (FIG. 2), which is retained by the first body portion 206 (FIG. 2). In the illustrated example, the firing mechanism 202 includes a seal 330 between the housing 324 of the firing pin assembly 322 and the housing 300 of the firing mechanism 202. The seal 330 limits or prevents air leakage between the housings 300, 324 (before firing) and also limits or prevents leakage of combustion gasses after the primary charge 314 is initiated.

In the illustrated example, the firing pin assembly 322 includes a firing pin piston 332 disposed in the housing 324. The firing pin piston 332 includes a piston body 334 and a piercing pin 336 coupled to and extending downward from the piston body 334. In this example, the piercing pin 336 is threadably coupled to the piston body 334. In some examples, this allows for easy assembly, positioning, and installation. In other examples, the piercing pin 336 can be coupled to the piston body 334 via other techniques (e.g., welding, fasteners, etc.). In still other examples, the piercing pin 336 and the piston body 334 can be formed as a single unitary part or component (e.g., a monolithic structure). In some examples, the piercing pin 336 is constructed of metal, such as steel. In the illustrated example, the housing 324 of the firing pin assembly 322 defines an upper channel 338 in the first end 326. The piston body 334 is disposed in and moveable (e.g., slidable) up and down in the upper channel 338. In the illustrated example, one or more seals 340 (e.g., o-rings) are disposed between the piston body 334 and the housing 324.

In the illustrated example of FIG. 3, the housing 324 of the firing pin assembly 322 also defines a central pin channel 342 between the upper channel 338 and the second end 328. The piercing pin 336 is disposed in and moveable (e.g., slidable) in the central pin channel 342. The housing 324 of the firing pin assembly 322 defines a first lower channel 344 and a second lower channel 346 that extend between the upper channel 338 and the second end 328. In the illustrated example, the firing pin piston 332 includes a first firing pin 348 that extends from the piston body 334 into the first lower channel 344 and a second firing pin 350 that extends from the piston body 334 into the second lower channel 346. In the illustrated example, the firing pin assembly 322 includes a first percussion primer 352 disposed in the first lower channel 344 and a second percussion primer 354 disposed in the second lower channel 346. The central pin channel 342 is parallel to and between the first and second lower channels 344, 346. While in this example the firing pin assembly 322 includes two lower channels and two percussion primers, in other examples, the firing pin assembly 322 may only include one lower channel and one percussion primer.

In an example firing sequence, a pressurized signal is received on the top of the firing pin piston 332. This creates a force the moves the firing pin piston 332 downward in FIG. 3 toward the primary charge 314. As the firing pin piston 332 moves downward toward the primary charge 314, the piercing pin 336 punctures or pierces the first closure disc 316. This creates a hole or opening in the first closure disc 316. At the same time or after, the first and second firing pins 348, 350 of the firing pin piston 332 engage or impact the first and second percussion primers 352, 354. The percussion primers 352, 354 activate (e.g., burst) to emit hot byproducts and/or a spark. The hot byproducts and/or spark travels through the channel 310 and through the hole created in the first closure disc 316 to the primary charge 314. The primary charge 314 activates (e.g., ignites) and ruptures the second closure disc 318. Therefore, in response to a firing signal, the firing pin piston 332 is moved toward the primary charge 314 such that the piercing pin 336 punctures the first closure disc 316 and the first firing pin 348 engages the first percussion primer 352 to ignite the primary charge 314. The high pressure ignition byproducts from the primary charge 314 fill the chamber 212 (FIG. 2) of the pyrotechnic device 200 (FIG. 2), which moves the piston 214 (FIG. 2).

Because the piercing pin 336 pierces or punctures the first closure disc 316 to provide a path for the ignition products, the example firing mechanism 202 does not include an ignition charge between the percussion primers 352, 354 and the primary charge 314 as seen in known firing mechanisms. Such ignition charges are not retained in their own enclosures and therefore limit the life of the firing mechanism. Therefore, in the example firing mechanism 202, all propellant material in the firing mechanism 202 is hermetically sealed or protected by the welded enclosure. This significantly increases the life span or shelf life of the example firing mechanism 202 compared to known firing mechanisms. This also reduces costs and weight associated with the firing mechanism 202.

In the illustrated example of FIG. 3, the firing mechanism 202 includes a shear pin 356 that extends through the housing 324 and the firing pin piston 332. The shear pin 356 holds the firing pin piston 332 in place until a sufficient force from a pressurized firing signal is created on the firing pin piston 332. This prevents the firing pin piston 322 from pre-maturely moving in the housing 324 and accidently igniting the primary charge 314. When a sufficient force is created on the firing pin piston 332 from the pressurized firing signal, this force causes the shear pin 356 to break, which allows the firing pin piston 332 to move downward in the housing 324. Therefore, the firing pin piston 332 has a certain surface area (e.g., on the top side) on which the pressurized firing signal operates to (1) break the shear pin 356 and (2) move the firing pin piston 332 downward with enough force to puncture the first closure disc 316. In some examples, the pressurized firing signal is about at least 450 pounds-per-square-inch (psi). In other examples, the pressurized firing signal may be greater than or less than 450 psi.

In the illustrated example, the distal ends of the first and second firing pins 348, 350 have semi-circular nubs or protrusions 358, 360. In some examples, this shape results in an increased impact force per unit area (by reducing the area of contact) of the firing pin piston 332 on the percussion primers 352, 354. In other examples, the distal ends of the first and second firing pins 348, 350 may have another shape or may be flat.

In the illustrated example, the piercing pin 336 has a barbed tip or end 362. The barbed tip 362 is formed by a shaft 364 with a conical or pointed tip 366. The widest part of the conical tip 366 is wider than the shaft 364. As such, when the conical tip 366 punctures the first closure disc 316, the conical tip 366 creates an opening that is larger than the shaft 364. This creates a flow path between the shaft 364 and the first closure disc 316 for the spark from the percussion primers 352, 354 to reach the primary charge 314.

As shown in FIG. 3, when the firing pin piston 332 is in the pre-fired position, the first firing pin 348 is spaced from the first percussion primer 352 by a first distance of D1. The second firing pin 350 is similarly spaced from the second percussion primer 354 by the first distance of D1. Further, the piercing pin 336 (e.g., the barbed tip 362 of the piercing pin 336) is spaced from the first closure disc 316 by a second distance of D2. The second distance D2 is less than the first distance D1. Therefore, when the firing pin piston 332 is moved toward the primary charge 314 (e.g., downward in FIG. 3), the piercing pin 336 engages or punctures the first closure disc 316 before the first and second firing pins 348, 350 engage the percussion primers 352, 354. This enables the piercing pin 336 to puncture the first closure disc 316 before the percussion primers 352, 354 are ignited. Therefore, when the percussion primers 352, 354 are triggered, the spark can travel to the primary charge 314.

Figure 4B:
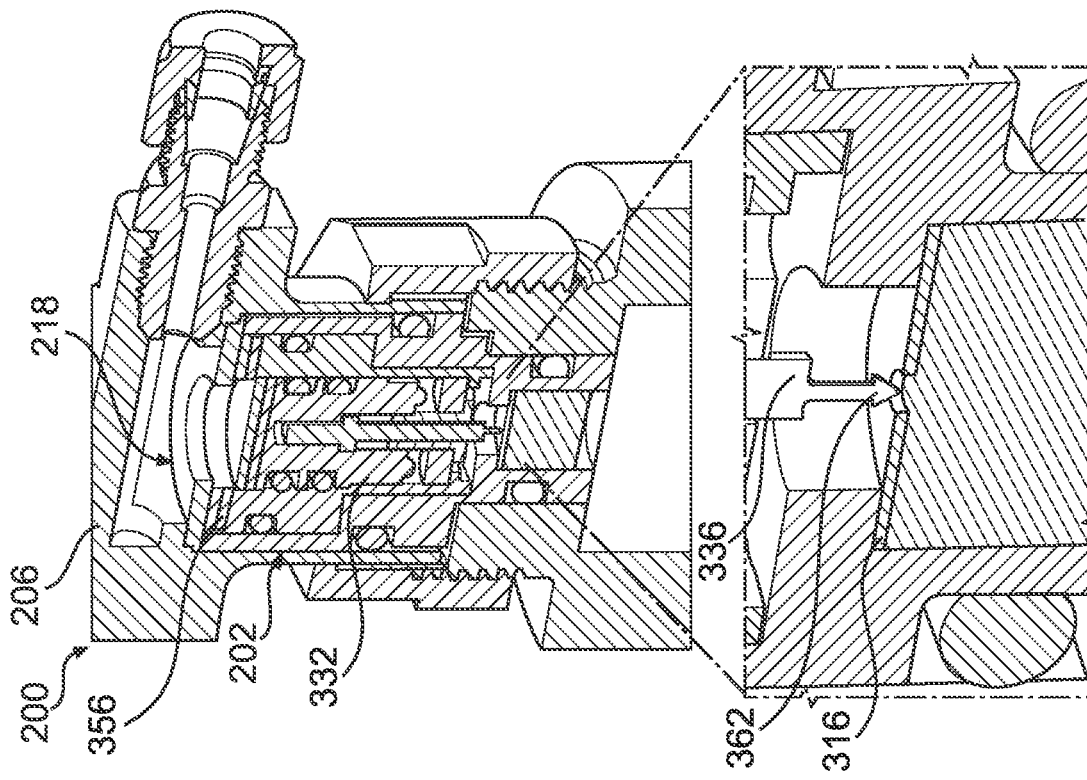
FIGS. 4A-4C show an example sequence of firing the example firing mechanism of FIGS. 2 and 3.
Figure 4A:
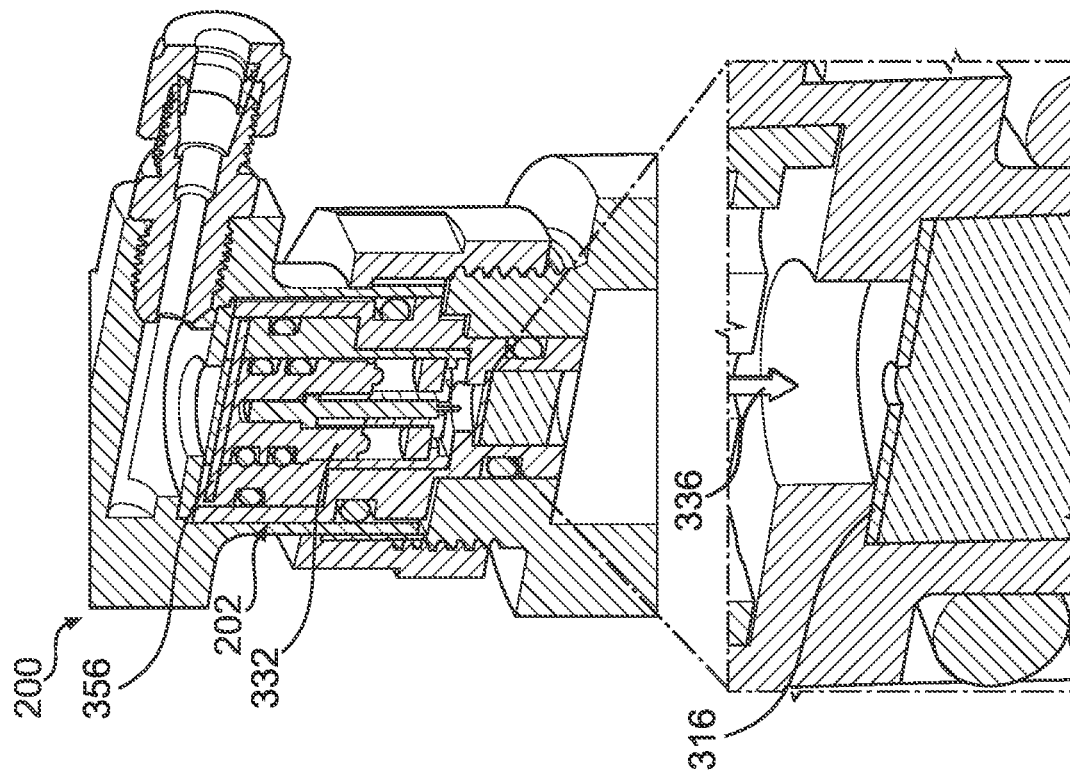
Figure 4C:
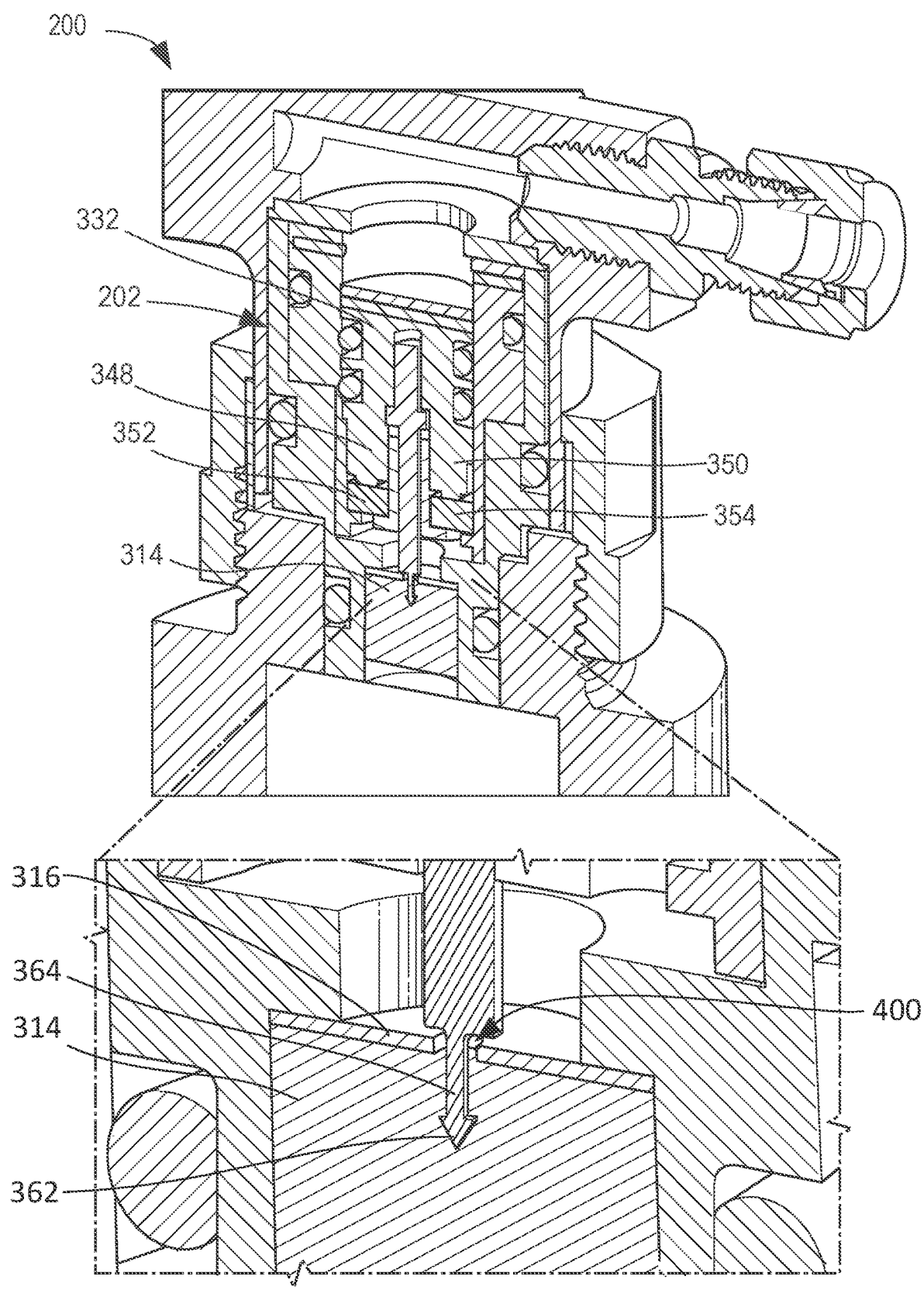

FIGS. 4A-4C illustrate an example sequence of firing the firing mechanism 202 in the pyrotechnic device 200. Each of FIGS. 4A-4C shows a perspective cross-sectional view of the pyrotechnic device 200 and the firing mechanism 202 and an enlarged callout of the first closure disc 316 of the firing mechanism 202.

FIG. 4A shows the firing pin piston 332 in the pre-fired position. The shear pin 356 is intact, which holds the firing pin piston 332 in this position until a firing signal is received. As shown in the callout of FIG. 4A, the piercing pin 336 is spaced apart from the first closure disc 316.

As shown in FIG. 4B, when a firing signal is received, the pressure in the passageway 218 of the first body portion 206 creates a force on the firing pin piston 332. The force on the firing pin piston 332 causes the shear pin 356 to break. As the firing pin piston 332 moves downward, the barbed tip 362 of the piercing pin 336 engages the first closure disc 316. This punctures a hole or opening in the first closure disc 316.

As shown in FIG. 4C, the firing pin piston 332 continues to move downward until the first and second firing pins 348, 350 of the firing pin piston 332 impact the first and second percussion primers 352, 354. When the first and second percussion primers 352, 354 are impacted by the first and second firing pins 348, 350, the first and second percussion primers 352, 354 activate. This creates a hot spark and/or hot byproducts that travel downward to the primary charge 314. As shown in the callout in FIG. 4C, the barbed tip 362 has passed through the first closure disc 316, which creates an opening 400. The opening is larger than the shaft 364, which forms a forms a flow path for the hot spark or byproducts. The hot spark or byproducts ignite the primary charge 314. The primary charge 314 ruptures the second closure disc 318 (FIG. 3), which creates a high pressure burst in the chamber of the pyrotechnic device 200.

From the foregoing, it will be appreciated that example apparatus have been disclosed that improve sealing of a primary propellant charge in a firing mechanism of a pyrotechnic device. This improved sealing significantly increases the lifespan of the firing mechanism, thereby reducing costs associated with maintenance and replacement of the firing mechanism. Examples disclosed herein also provide an improved manner for puncturing a closure disc to ensure the primary charge is ignited.

Example methods, apparatus, systems, and articles of manufacture are disclosed herein. Further examples and combinations thereof include the following:

Example 1 is a firing mechanism for a pyrotechnic device. The firing mechanism comprises a housing defining a first bore, a second bore, and a channel between the first bore and the second bore, a primary charge disposed in the second bore, a closure disc between the second bore and the channel, and a firing pin assembly disposed in the first bore. The firing pin assembly includes a percussion primer and a firing pin piston including a piston body, a firing pin extending from the piston body, and a piercing pin extending from the piston body. In response to a firing signal, the firing pin piston is moved toward the primary charge such that the piercing pin punctures the closure disc and the firing pin engages the percussion primer to ignite the primary charge.

Example 2 includes the firing mechanism of Example 1, wherein the closure disc is welded to the housing.

Example 3 includes the firing mechanism of Example 2, wherein the closure disc is a first closure disc, the firing mechanism further including a second closure disc welded to the housing such that the primary charge is hermetically sealed between the first and second closure discs.

Example 4 includes the firing mechanism of any of Examples 1-3, wherein the closure disc is constructed of metal.

Example 5 includes the firing mechanism of any of Examples 1-4, wherein, when the firing pin piston is in a pre-fired position, the firing pin is a first distance from the percussion primer and the piercing pin is a second distance from the first closure disc, the second distance being less than the first distance, such that when the firing pin piston is moved toward the primary charge, the piercing pin punctures the closure disc before the firing pin engages the percussion primer.

Example 6 includes the firing mechanism of any of Examples 1-5, wherein the piercing pin has a barbed tip.

Example 7 includes the firing mechanism of any of Examples 1-6, wherein the piercing pin is threadably coupled to the piston body.

Example 8 includes the firing mechanism of any of Examples 1-7, wherein the percussion primer is a first percussion primer and the firing pin is a first firing pin. The firing pin assembly further includes a second percussion primer. The firing pin piston has a second firing pin extending from the piston body, such that when the firing pin piston is moved toward the primary charge the second firing pin engages the second percussion primer.

Example 9 includes the firing mechanism of Example 8, wherein the housing defines a first lower channel, a second lower channel, and a central pin channel. The first percussion primer is disposed in the first lower channel, the second percussion primer is disposed in the second lower channel, and the piercing pin is disposed in the central pin channel. The central pin channel is parallel to and between the first and second lower channels.

Example 10 includes the firing mechanism of any of Examples 1-9, wherein the firing mechanism does not include an ignition charge between the percussion primer and the primary charge.

Example 11 is a pyrotechnic device comprising a body defining a chamber, a piston disposed in the chamber, and a firing mechanism coupled to the body. The firing mechanism is to, when triggered, generate high pressure in the chamber to move the piston. The firing mechanism includes a housing defining a first bore, a second bore, and a channel between the first bore and the second bore, a firing pin assembly disposed in the first bore, a primary charge disposed in the second bore, and first and second closure discs welded to the housing to hermetically seal the primary charge in the second bore.

Example 12 includes the pyrotechnic device of Example 11, wherein the first closure disc is welded to an inner surface of the housing defining the second bore.

Example 13 includes the pyrotechnic device of Example 12, wherein the second closure disc is welded to an end of the housing over the second bore.

Example 14 includes the pyrotechnic device of any of Examples 11-13, wherein the firing pin assembly includes a firing pin piston including a piercing pin to puncture the first closure disc when the firing pin piston is moved toward the primary charge.

Example 15 includes the pyrotechnic device of Example 14, wherein the piercing pin has a barbed tip.

Example 16 includes the pyrotechnic device of Examples 14 or 15, wherein the firing pin piston includes a piston body, the piercing pin coupled to and extending from the piston body.

Example 17 includes the pyrotechnic device of Example 16, wherein the firing pin assembly includes a percussion primer, and wherein the firing pin piston includes a firing pin extending from the piston body. The firing pin is to engage the percussion primer when the firing pin piston is moved toward the primary charge.

Example 18 is an aircraft comprising a forward fuselage defining a cockpit, a canopy removably coupled to the forward fuselage over the cockpit, and a pyrotechnic device to unlatch the canopy from the forward fuselage. The pyrotechnic device includes a firing mechanism. The firing mechanism includes a housing defining a first bore, a second bore, and a channel between the first bore and the second bore, a primary charge disposed in the second bore, a closure disc between the second bore and the channel, a percussion primer, and a firing pin piston including a piston body, a firing pin extending from the piston body, and a piercing pin extending from the piston body. The firing pin is a first distance from the percussion primer and the piercing pin is a second distance from the closure disc. The second distance is less than the first distance.

Example 19 includes the aircraft of Example 18, wherein the closure disc is welded to the housing.

Example 20 includes the aircraft of Examples 18 and 19, wherein the piercing pin has a barbed tip.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus, systems, and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An aircraft comprising:
    a forward fuselage defining a cockpit;
    a canopy removably coupled to the forward fuselage over the cockpit; and
    a pyrotechnic device to unlatch the canopy from the forward fuselage, the pyrotechnic device including a firing mechanism, the firing mechanism including:
        a housing defining a first bore, a second bore, and a channel between the first bore and the second bore;
        a primary charge disposed in the second bore;
        a closure disc between the second bore and the channel;
        a percussion primer; and
        a firing pin piston including a piston body, a firing pin extending from the piston body, and a piercing pin extending from the piston body, the firing pin being a first distance from the percussion primer and the piercing pin being a second distance from the closure disc, the second distance being less than the first distance.

2. The aircraft of claim 1, wherein the closure disc is welded to the housing.

3. The aircraft of claim 1, wherein the piercing pin has a barbed tip.

4. The aircraft of claim 1, wherein, in response to a firing signal, the firing pin piston is moved toward the primary charge such that the piercing pin punctures the closure disc and the firing pin engages the percussion primer to ignite the primary charge.

5. The aircraft of claim 2, wherein the closure disc is a first closure disc, the firing mechanism further including a second closure disc welded to the housing such that the primary charge is hermetically sealed between the first and second closure discs.

6. The aircraft of claim 1, wherein the closure disc is constructed of metal.

7. The aircraft of claim 1, wherein, when the firing pin piston is in a pre-fired position, the firing pin is a first distance from the percussion primer and the piercing pin is a second distance from the closure disc, the second distance being less than the first distance, such that when the firing pin piston is moved toward the primary charge, the piercing pin punctures the closure disc before the firing pin engages the percussion primer.

8. The aircraft of claim 1, wherein the piercing pin is threadably coupled to the piston body.

9. The aircraft of claim 1, wherein the percussion primer is a first percussion primer and the firing pin is a first firing pin, the firing mechanism further including a second percussion primer, the firing pin piston having a second firing pin extending from the piston body, wherein the first firing pin engages the first percussion primer and the second firing pin engages the second percussion primer when the firing pin piston is moved toward the primary charge.

10. The aircraft of claim 9, wherein the housing defines a first lower channel, a second lower channel, and a central pin channel, the first percussion primer disposed in the first lower channel, the second percussion primer disposed in the second lower channel, and the piercing pin disposed in the central pin channel, wherein the central pin channel is parallel to and between the first and second lower channels.

11. The aircraft of claim 1, wherein the firing mechanism does not include an ignition charge between the percussion primer and the primary charge.

12. The aircraft of claim 1, wherein the pyrotechnic device further includes:
    a body defining a chamber; and
    a piston disposed in the chamber, wherein the firing mechanism is coupled to the body, the firing mechanism to, when triggered, generate high pressure in the chamber to move the piston, the firing mechanism including.

13. The aircraft of claim 1, wherein the closure disc is a first closure disc, and further including a second closure disc.

14. The aircraft of claim 13, wherein the first closure disc is welded to an inner surface of the housing defining the second bore.

15. The aircraft of claim 14, wherein the second closure disc is welded to an end of the housing over the second bore.

16. The aircraft of claim 14, wherein the piercing pin is to puncture the first closure disc when the firing pin piston is moved toward the primary charge.

17. The aircraft of claim 1, wherein the piercing pin is to puncture the closure disc prior to the firing pin igniting the percussion primer.

18. The aircraft of claim 1, further including a shear pin that extends through the housing and the firing pin piston, the shear pin to secure a position of the firing pin piston until a sufficient force from a firing signal is created on the firing pin piston.

19. The aircraft of claim 1, wherein the piercing pin is to puncture the closure disc prior to the firing pin igniting the percussion primer, the puncture in the closure disc to provide a path for a spark generated between the firing pin and the percussion primer and the primary charge disposed in the second bore.

* * * * *